United States Patent
Bogdan et al.

(10) Patent No.: US 11,826,738 B2
(45) Date of Patent: Nov. 28, 2023

(54) HIGH ACTIVITY AND HIGH DISTILLATE YIELD HYDROCRACKING CATALYSTS WITH INTIMATE INTERACTION BETWEEN UNSUPPORTED METAL OXIDE AND ZEOLITE

(71) Applicant: UOP LLC, Des Plaines, IL (US)

(72) Inventors: Paula Bogdan, Mount Prospect, IL (US); Melanie Timmons Schaal, Schaumburg, IL (US); Susie C. Martins, Carol Stream, IL (US); Lisa Knight, Chicago, IL (US); Wharton Sinkler, Des Plaines, IL (US); Gregory Kuzmanich, Arlington Heights, IL (US); Maureen Bricker, Buffalo Grove, IL (US); Suheil F. Abdo, Lincolnshire, IL (US); Stuart Miller, Arlington Heights, IL (US); Wei Pan, Hoffman Estates, IL (US); Richard R. Willis, Cary, IL (US)

(73) Assignee: UOP LLC, Des Plaines, IL (US)

( * ) Notice: Subject to any disclaimer, the term of this patent is extended or adjusted under 35 U.S.C. 154(b) by 58 days.

(21) Appl. No.: 17/380,667

(22) Filed: Jul. 20, 2021

(65) Prior Publication Data

US 2022/0023846 A1     Jan. 27, 2022

Related U.S. Application Data

(60) Provisional application No. 63/056,912, filed on Jul. 27, 2020.

(51) Int. Cl.
| | |
|---|---|
| *B01J 35/00* | (2006.01) |
| *B01J 29/70* | (2006.01) |
| *B01J 29/08* | (2006.01) |
| *B01J 37/04* | (2006.01) |
| *C10G 49/08* | (2006.01) |
| *B01J 37/00* | (2006.01) |
| *B01J 37/08* | (2006.01) |
| *C10G 47/16* | (2006.01) |

(52) U.S. Cl.
CPC ......... *B01J 29/7007* (2013.01); *B01J 29/084* (2013.01); *B01J 35/0006* (2013.01); *B01J 37/0009* (2013.01); *B01J 37/04* (2013.01); *B01J 37/08* (2013.01); *C10G 47/16* (2013.01); *C10G 49/08* (2013.01); *C10G 2300/1074* (2013.01); *C10G 2300/70* (2013.01)

(58) Field of Classification Search
CPC .. B01J 29/084; B01J 29/7007; B01J 35/0006; B01J 37/0063; B01J 37/0009; B01J 37/04; C10G 45/04–12; C10G 47/04; C10G 49/02–08
See application file for complete search history.

(56) References Cited

U.S. PATENT DOCUMENTS

| | | |
|---|---|---|
| 3,678,124 A | 7/1972 | Boresko |
| 4,326,947 A | 4/1982 | Sawyer et al. |
| 4,820,402 A | 4/1989 | Partridge |
| 6,156,695 A | 12/2000 | Soled et al. |
| 6,162,350 A | 12/2000 | Soled et al. |
| 6,534,437 B2 | 3/2003 | Eijsbouts et al. |
| 7,648,939 B2 | 1/2010 | Domokos et al. |
| 7,648,941 B2 | 1/2010 | Soled et al. |
| 8,722,563 B2 | 5/2014 | Soled et al. |
| 2019/0078027 A1 | 3/2019 | Deimund et al. |

FOREIGN PATENT DOCUMENTS

| | | |
|---|---|---|
| CN | 102049281 A | 5/2011 |
| EP | 1171549 B1 | 5/2008 |

OTHER PUBLICATIONS

Abraham Clearfield et al., Studies in Heavy-Metal Molybdates. I. Crystal Structure of a Basic Zinc Molybdate, NaZn2OH(H2O)(MoO4) 2a, Inorganic Chemistry, vol. 15, No. 2, 1976, 335-338.
Clearfield et al., SStudies in Heavy-Metal Molybdates. 2. Crystal Structure of Disodium Di^ -hydroxo-dizinc (II) Molybdate Chemistry, vol. 16, No. 3., 1977, 628-631.
Clearfiled et al., Preparation and Structure of Maganese Molybdates, Inorg. Chem. 1985, 24, 2606-4609.
Doron Levin et al., Crystal Structure of Ammonium Nickel Molybdate Prepared by Chemical Precipitation, Department of Chemical Engineering, Massachusetts Institute of Technology, Cambridge, Massachusetts 02139, Exxon Research and Engineering Compay, Inorg. Chem 1996, 35, 4191-4197.
Anderson Dias, et al., Thermodynamic calculations and modeling of hydrothermal synthesis of nickel tungstates, Journal of the European Ceramic Society 21 (2001) 2061-2065.
Chengwu Dong et al., Effect of β-zeolite nanoclusters on the acidity and hydrodesulfurization activity of an unsupported NieMo catalyst, Catalysis Communications 119 (2019) 164-169.
EP 21187544.8, European Search Report dated Aug. 12, 2021.

*Primary Examiner* — Renee Robinson
(74) *Attorney, Agent, or Firm* — Paschall & Associates, LLC; Mark Goldberg

(57) ABSTRACT

A hydroprocessing catalyst with improved performance has been produced that involves an intimately mixed unsupported metal oxide with a zeolite or other acid function. The intimate mixing allows an intimate interaction between the unsupported metal oxide and the acid function. The hydroprocessing catalyst may be used alone or may be incorporated with a portion of a conventional hydrocracking catalyst.

19 Claims, No Drawings

HIGH ACTIVITY AND HIGH DISTILLATE YIELD HYDROCRACKING CATALYSTS WITH INTIMATE INTERACTION BETWEEN UNSUPPORTED METAL OXIDE AND ZEOLITE

CROSS-REFERENCE TO RELATED APPLICATIONS

This application claims priority from U.S. Provisional Application No. 63/056,912 filed Jul. 27, 2020, which is incorporated herein in its entirety.

FIELD OF THE INVENTION

This invention relates to a new hydroprocessing catalyst. More particularly this invention relates to an intimately mixed unsupported metal oxide with a zeolite or other acid function and its use as a hydroprocessing catalyst. Hydroprocessing may include hydrodenitrification, hydrodesulfurization, hydrodemetallation, hydrodesilication, hydrodearomatization, hydroisomerization, hydrotreating, hydrofining and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultralow sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultradeep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution, *C.R. Acad Sci.*, 261, 5490, who assigned the different phases he observed as being <De, <1>x or <Dy and determined the crystal structures for <1>x and <Dy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the <1>x and <Dy phases, see examples A. Clearfield, M. J. Sims, R. Gopal, *Inorg. Chem.*, 15,335; A. Clearfield, R. Gopal, C. H. Saldarriaga-Molina, *Inorg. Chem.*, 16, 628. Single crystal studies on the product from a hydrothermal approach allowed confirmation of the <1>x structure, however they failed in their attempts to synthesize <Dy and instead synthesized an alternative phase, Na—Cu(OH)(MoO4), see A. Clearfield, A Moini, P. R. Rudolf, *Inorg. Chem.*, 24, 4606.

The structure of <Dy was not confirmed until 1996 by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide ($Zn_4Al(OH)_{12}CO_{3\ z}H2O$). See for example D. Levin, S. L. Soled, J. Y. Ying, *Inorg. Chem.*, 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. *Ann. Chim.* (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

Since the initial reports of unsupported Ni—Mo/W oxidic precursors, U.S. Pat. No. 6,156,695, there have been several reports describing materials which, when sulfided, claim to have enhanced hydrotreating activities. U.S. Pat. No. 6,534,437 discloses a process for preparing a mixed metal catalyst having a powder X-ray diffraction pattern showing reflections at approximately 2.53 Angstroms and 1.70 angstroms. U.S. Pat. No. 6,534,437 differentiates itself from U.S. Pat. No. 3,678,124 and WO 9903578 based on characteristic full width half maximum line widths of more resolved reflections, present in WO 9903578, claiming that the invention of U.S. Pat. No. 6,534,437 possesses a 'different microstructure' from prior work, WO 9903578.

U.S. Pat. No. 8,722,563 describes preparing a series of catalyst precursors with compositions comprising at least one Group VI metal and one metal from Group VIII through Group X. One of the comparative examples described in the patent yields a comparable powder X-ray diffraction pattern to that obtained in U.S. Pat. No. 6,534,437 and is described as the assynthesized and dried hexagonal NiWO4 catalyst precursor.

U.S. Pat. No. 7,648,941 discloses synthetic examples of a series of different bimetallic materials and states that the bulk bimetallic catalyst of the invention has a metastable structure and further asserts that the crystalline structure of the metastable hexagonal NiWO4 phase in the preferred catalysts of the invention has lattice parameters a=2.92 Å, b=2.93 Å, and c=4.64 Å and that the bulk catalyst has a metastable hexagonal structure having an X-ray diffraction pattern with a single reflection between 58 and 65°. As a point of reference, the largest two d-spacings which can be generated in an X-ray diffraction pattern by a hexagonal cell with lattice parameters a=2.92 Å, b=2.93 Å, and c=4.64 Å are 4.64 Å and 2.53 Å.

A Dias and V. S. T. Ciminelli, *J Eur. Ceramic. Soc*, 2001, 21, 2061-2065 reported on the thermodynamic calculations and modeling of hydrothermally synthesized nickel tungstates. They present a series of calculated yield diagrams at various synthesis temperatures highlighting the pH and reagent concentrations which yield NiWO4. All of their calculations predict the formation of a nickel tungstate between pH 2 and 7.5, with nickel hydroxide being the main product at higher pH's. The authors show the X-ray diffraction patterns for the samples produced at 200, 230 and 260° C. within and without their predicted yield zones. The X-ray diffraction pattern for the $NiWO_4$ material synthesized at 200° C. can be described as poorly crystalline and the reference asserts that it is important to note that a crystallized material was obtained at 200° C., but with extremely fine particle size indicated by broad X-ray diffraction peaks. The reference asserts this can be explained by the energy barrier for the precipitation, which is closely related to the nature of the rate-controlling step in the dominant formation process. The reference puts forth that higher reaction temperatures accelerate the crystallization process because of greater thermal energy to overcome the energy barrier for transformation, and as a consequence, materials with higher crystallinity and/or particle size can be obtained. The reference suggests that the phase obtained at 200° C. is essentially a poorly crystalline, nano-wolframite ($NiWO_4$), and this conclusion is consistent with calculated yield diagrams of the reference.

SUMMARY OF INVENTION

A catalyst is provided that comprises an acid function and a metal function wherein the acid function and metal function are less than 300 um apart. The acid function and metal function are intimately mixed prior to catalyst forming. The intimate mixing and resulting intimate interaction provide significantly improved performance as compared to a catalyst where the metal and the acid function are merely stacked or otherwise not in close enough proximity. In this catalyst, the acid function and metal function are relatively close together, such as from about ≤1 to 300 um apart. Preferably the median, non-sonicated particle size of the metal and acid functions will be <50 um and more preferably <25 um. The metal function is derived from the unsupported mixed metal oxide or mixed metal hydroxide precursor and it comprises two or more oxide and/or hydroxide precursors of Group VIB, Group VIII, and Group IIB. A suitable mixed metal oxide or mixed metal hydroxide has two to four different mixed metal oxides or mixed metal hydroxides selected from these Groups, preferably at least one Group VIB and one Group VIII mixed metal oxide or mixed metal hydroxide precursor. It is synthesized according to existing processes and dried at a temperature of at least 100° C., and less than 300° C. The moisture content, as measured by % loss on ignition (LOI) is generally in the range of 5-30%, or 10-30%, or 15-30%, or 20-30%, or 25-30%. The acid function may be contributed by a zeolite, including but not limited to a Y zeolite, a beta zeolite, modified zeolites, or combinations thereof, and/or an amorphous silica alumina or non-zeolite molecular sieve or mixtures thereof in a concentration range from about 0.5 to 35 wt %. The catalyst is preferably binderless, although a small amount of binder may be incorporated to increase strength.

In another embodiment, the invention involves a process comprising introducing a feedstock to a hydroprocessing reaction zone at hydroprocessing reaction conditions in the presence of a hydroprocessing catalyst consisting of an acid function, Group VIII metals, Group VIB metals, and optionally Group IIB metals which are intimately mixed, to produce a hydroprocessed product. The feedstock may be selected from vacuum gas oil, kerosene, jet fuel, distillate, light cycle oil, naphtha, deasphalted oil, atmospheric gas oil, coker gas oil and mixtures thereof. In the hydroprocessing reaction zone is at least one catalyst bed wherein at least one catalyst bed comprises a catalyst comprising an intimate mixture of an acid function, Group VIII metals, Group VIB metals, and optionally Group IIB metals. The catalyst may further comprise an additional refractory oxide. The acid function is provided by a zeolite, including but not limited to a Y zeolite, a Beta zeolite, or modified zeolites, an amorphous silica alumina, a non-zeolite molecular sieve or mixtures thereof in concentrations from about 0.5 to 35 wt % of the hydroprocessing catalyst. The Group VIII metal ranges from about 2 to 25 wt % of the hydroprocessing catalyst and the Group VIB metal ranges from about 5 to 55 wt % of the hydroprocessing catalyst. The Group IIB component ranges from about 0 to 5 wt % of the hydroprocessing catalyst. This intimately mixed catalyst described herein can be used independently and results in significantly improved activity and yield. Additionally, it has been found that replacing a portion of a standard commercial hydroprocessing catalyst with the intimately mixed catalyst described herein also results in notably improved yield and activity. The hydroprocessing catalyst may comprise a layer within the hydroprocessing reaction zone, which further comprises a second layer comprising a second hydroprocessing catalyst that is different from said hydroprocessing catalyst. In such cases, the intimately mixed hydroprocessing catalyst comprises about 5-≤100%, preferably ≥20% of a total volume of catalyst in the hydroprocessing reaction zone. In yet another embodiment, mixtures of the two hydroprocessing catalyst may be used.

Also provided, is a method of preparing a catalyst composition comprising intimately mixing an unsupported metal oxide with an acid function. The unsupported metal oxide comprises Group VIII metals and Group VIB metals (and optionally Group IIB metals) and the acid function comprises a zeolite, including but not limited to a Y zeolite, a Beta zeolite, or a modified zeolite, a non-zeolite molecular sieve, an amorphous silica alumina or mixtures thereof. If a zeolite is used as the acid function, less than 4% of the metal in the catalyst composition is incorporated into the zeolite. The intimate mixing may be obtained by sufficiently reducing the particle size of the components and may comprise techniques such as slurry/wet grinding, co-mulling, or mixing. During the forming step additional additives may be included such as extrusion aids, burn out agents, peptizing agents, etcetera as known by those skilled in the art. The unsupported metal oxide may first be heat treated; heat treatment of 60 to 300° C. may be used, more preferably heat treatment of 100 to 150° C. may be used. Additionally, the acid function may optionally be first heat treated prior to being combined with said unsupported metal oxide. The heat treatment used for the acid function may be at less than about 550° C. and in some cases up to 650° C. and may vary depending on the nature of the zeolite being used. After the intimately mixed catalyst is formed, the catalyst may be heat treated at 60 to 300° C. or more preferably from 100 to 150° C.

DETAILED DESCRIPTION OF THE INVENTION

The catalyst disclosed herein involves the intimate mixing of an unsupported metal oxide with a zeolite or other acid function. The catalyst comprises an intimately mixed yet unsupported non-refractory and unsupported mixed metal oxide.

The catalyst has been tested for first stage hydrocracking applications where higher total distillate yields, and higher activity are greatly valued. Initial work was targeted towards two stage hydrocracking configurations (where it may be possible to capitalize on a reduced recycle rate) however, given the yield improvements and performance at higher conversions the catalyst concept can also perform well in single stage configurations and once through configurations as well. This concept may have applications in other related areas such as second stage distillate hydrocracking. Additionally, with the increased activity of the catalyst it becomes feasible to build smaller reactors or load less catalyst into the reactor. As discussed, the catalyst of the invention may be used independently or in stacked or mixed configurations with another hydroprocessing catalyst. As described below, in addition to finding the advantage of the intimately mixed catalyst, it has been found that stacking a traditional catalyst on top of a catalyst that contains the intimate interaction between unsupported metal oxides and an acid function enables a performance advantage to be obtained without the cost associated with a full reactor loading.

Conventional hydrocracking catalysts are often prepared by impregnation where metal salts are dissolved in a solution and a support (often preformed into a given shape) is introduced to the solution and the excess solution is removed. In such systems the metal function may interact with the support and/or the zeolite via hydroxyl groups etc. Alternatively, hydrocracking catalysts may be prepared by co-mulling. In this case metal salts are often introduced in the dough forming step where water is typically added and typically some metal salt dissolution occurs. If metal oxides are used in this step, they are typically introduced as individual metal oxides. In this invention the unsupported metal oxide that is used contains more than one metal oxide component that has already been formulated to achieve the desired composition. In this preparation the particle size of the unsupported metal oxide is typically reduced after the material has been prepared and the particle size of the zeolite may also be reduced. This may be achieved, for example, by grinding, milling, mulling, etc. The reduction in particle size is completed before the extrusion/forming step. This step along with sufficient mixing, which again can be achieved by mulling, allows for an intimate interaction between the metal and acid functions. Using this technique, the unsupported metal oxide and the acid functions typically remain as separate, discrete particles even in the final, formed catalyst. TEM analysis was completed and EDS spectra were collected to assess the elemental composition; results showed that <4% of the metal is incorporated into the zeolite. Additionally, in many traditional preparation methods the formed material is heated to higher temperatures (e.g. 500° C.); in this case, formed material is not typically treated at >300° C. and is often not treated at temperatures of greater than 100° C. prior to sulfiding. Although the metal and acid functions in this invention generally remain as discrete particles, they do have very close proximity. It has been shown that the spacing between the metal and acid functions must be less than 300 um or the performance will suffer; specifically, the total distillate yield will be notably lower than that obtained when a sufficiently intimate interaction is achieved.

In addition to the improved performance observed with the catalyst of this invention, it should be noted that in certain applications improved product properties have also been observed. For example, compared to a conventional, commercial catalyst at the same temperature and conversion, the catalyst of this invention has shown lower aromatics in the kerosene cut which can lead to a higher smoke point. Additionally, compared to the conventional catalyst, the catalyst of this invention gave lower normal paraffins in the unconverted oil, which indicates better cold flow properties.

Example 1

In the practice of the invention, a preferred embodiment is to stack a commercially used $1^{st}$ stage, distillate hydrocracking catalyst containing a Y-zeolite on top of a catalyst produced in accordance with this disclosure. Specifically, a commercial hydrocracking catalyst, such as one produced by UOP LLC, Des Plaines, Illinois is situated on top of a bed of a catalyst with high metal loading that is intimately mixed with a zeolite. For this work, the catalyst of the invention was prepared with 5 wt % of a Beta (Si/Al=44) zeolite and 95 wt % of an unsupported metal oxide powder; an additional 6.5 wt % of an extrusion aid was added. Water was added as needed to form a dough prior to extrusion. The material was mulled in a dry form for 15 minutes; water was added, the material was wet-mulled for 30 minutes and then extruded as a 1/16" cylinder and dried at 100° C. overnight.

The above catalyst was loaded into pilot plant reactors in a lower layer comprising about 20% of the total reactor volume and a standard commercial catalyst comprising the remainder of the reactor bed volume. The catalysts were sulfided in-situ and VGO feeds were sent through the reactor beds and the results were compared to reactor beds that were filled with only the standard commercial catalyst. The reactors with the lower layer of the above described intimately mixed catalyst leads to a 3-6° C. (7 to 12° F.) increase in activity and a 2.7 to 2.9 wt % improvement in distillate yield performance at 65% net conversion. The performance was shown to increase further by increasing the level of the intimately mixed catalyst of this invention. For example, by replacing the volume of conventional catalyst with the same volume of additional 5% Beta (Si/Al=44), 95 wt % unsupported metal oxide catalyst such that the entire catalyst bed contained the intimately mixed catalyst of this invention, the activity was ~10° C. (~18° F.) higher and the distillate yield was ~3 wt % higher than that observed in the stacked configuration at 65% net conversion.

Example 2

Two catalysts were prepared and evaluated. The first catalyst was prepared according to the invention where the particle size of a Y-zeolite and the particle size of an unsupported metal oxide were reduced such that the approximate median, non-sonicated particle size was less than ~25 um. The catalyst was formed using 7.9 wt % of the Y-zeolite and 92.1 wt % of an unsupported metal oxide that contained group VIII and group VIB metals. The catalyst was evaluated in a VGO feed. For comparison, a sample with non-intimate interaction between the metal and acid functions was prepared by using the same mass of Y-zeolite and the same mass of unsupported metal oxide in the reactor loading as the 'intimately' mixed catalyst except the unsupported metal oxide was added as 16×30 mesh material (with no zeolite) and the Y-zeolite was added as 16×30 mesh (with no metal oxide); the meshed Y-zeolite particles were physically mixed with the meshed unsupported metal oxide and evaluated. The sample with intimate interaction exhibited ~4.5 wt % higher distillate yield and ~3.3° C. (6° F.) higher activity at 65% net conversion than the sample prepared with the non-intimate interaction. As a more extreme case, the Y-zeolite meshed particles were also stacked in top/bottom bed configurations with the unsupported meshed particles. This led to a greater spacing between the metal and acid functions and a further decrease in performance as the samples did not even reach 65% net conversion when evaluated under the same testing protocol.

Example 3

A catalyst with an intimate interaction between the metal and acid functions was prepared using methods described herein. The catalyst was prepared with 1.5 wt % Beta zeolite (Si/Al=44), 3.2 wt % Y-zeolite, 95.3 wt % unsupported metal oxide. Again, the particle size was reduced such that the median non-sonicated particle size was less than ~25 um prior to the forming step. The catalyst was evaluated in a VGO. Compared to a conventional, commercial distillate hydrocracking catalyst, the catalyst exhibited 16.7° C. (30° F.) higher activity with ~1 wt % higher yield at 65% net conversion.

Specific Embodiments

While the following is described in conjunction with specific embodiments, it will be understood that this description is intended to illustrate and not limit the scope of the preceding description and the appended claims.

A first embodiment of the invention is a catalyst comprising an acid function and a metal function wherein the acid function and the metal function are less than 300 um apart wherein the acid function and the metal function are intimately mixed prior to catalyst forming. An embodiment of the invention is one, any or all of prior embodiments in this paragraph up through the first embodiment in this paragraph wherein the acid function and the metal function are between about ≤1 to 180 um apart. An embodiment of the invention is one, any or all of prior embodiments in this paragraph up through the first embodiment in this paragraph wherein the catalyst is binderless. An embodiment of the invention is one, any or all of prior embodiments in this paragraph up through the first embodiment in this paragraph comprising 0-30 wt % binder. An embodiment of the invention is one, any or all of prior embodiments in this paragraph up through the first embodiment in this paragraph wherein the metal function comprises a Group IIB, a Group VIII, a Group VIB metal or a mixture thereof. An embodiment of the invention is one, any or all of prior embodiments in this paragraph up through the first embodiment in this paragraph wherein the acid function is contributed by a zeolite, a non-zeolite molecular sieve or an amorphous silica alumina in a concentration range from about 0.5 to 35 wt %. An embodiment of the invention is one, any or all of prior embodiments in this paragraph up through the first embodiment in this paragraph wherein the zeolite is a Y zeolite, a beta zeolite, a modified zeolite, or mixtures thereof.

A second embodiment of the invention is a process comprising introducing a feedstock to a hydroprocessing reaction zone at hydroprocessing reaction conditions in the presence of a hydroprocessing catalyst, wherein the hydroprocessing catalyst is consisting of a metal selected from Group VIII metals, Group VIB metals, and Group IIB metals or mixtures thereof and an acid function wherein the metal and the acid function are intimately mixed, to produce a hydroprocessed product. An embodiment of the invention is one, any or all of prior embodiments in this paragraph up through the first embodiment in this paragraph wherein the hydroprocessed feedstock is selected from vacuum gas oil, kerosene, jet fuel, distillate, light cycle oil, naphtha, deasphalted oil, atmospheric gas oil, coker gas oil and mixtures thereof. An embodiment of the invention is one, any or all of prior embodiments in this paragraph up through the first embodiment in this paragraph wherein the hydroprocessing reaction zone comprises at least one catalyst bed wherein the at least one catalyst bed comprises the hydroprocessing catalyst. An embodiment of the invention is one, any or all of prior embodiments in this paragraph up through the first embodiment in this paragraph wherein the hydroprocessing catalyst further comprises an additional refractory oxide. An embodiment of the invention is one, any or all of prior embodiments in this paragraph up through the first embodiment in this paragraph wherein the acid function is provided by a zeolite, a non-zeolite molecular sieve, an amorphous silica alumina or mixtures thereof in concentrations from about 0.5 to 35 wt % of the hydroprocessing catalyst. An embodiment of the invention is one, any or all of prior embodiments in this paragraph up through the first embodiment in this paragraph wherein the zeolite is selected from a Y zeolite, a beta zeolite, a modified zeolite, or mixtures thereof. An embodiment of the invention is one, any or all of prior embodiments in this paragraph up through the first embodiment in this paragraph wherein the Group VIII metal ranges from about 2 to 25 wt % of the hydroprocessing catalyst and the Group VIB metal ranges from about 5 to 55 wt % of the hydroprocessing catalyst. An embodiment of the invention is one, any or all of prior embodiments in this paragraph up through the first embodiment in this paragraph wherein the hydroprocessing catalyst comprises a layer within the hydroprocessing reaction zone which further comprises a second layer comprising a second hydroprocessing catalyst that is different from the hydroprocessing catalyst. An embodiment of the invention is one, any or all of prior embodiments in this paragraph up through the first embodiment in this paragraph wherein the hydroprocessing catalyst comprises about 5-100% of a total volume of catalyst in the hydroprocessing reaction zone. An embodiment of the invention is one, any or all of prior embodiments in this paragraph up through the first embodiment in this paragraph wherein the hydroprocessing catalyst comprises about 20 wt % of a total volume of catalyst in the hydroprocessing reaction zone.

A third embodiment of the invention is a method of preparing a catalyst composition comprising intimate mixing an unsupported metal oxide with an acid function. An embodiment of the invention is one, any or all of prior embodiments in this paragraph up through the second embodiment in this paragraph wherein the unsupported metal oxide comprises Group VIII metals, and Group VIB metals, from 0-5 wt % Group IIB metals and the acid function comprises a zeolite, a non-zeolite molecular sieve, an amorphous silica alumina or mixtures thereof. An embodiment of the invention is one, any or all of prior embodiments in this paragraph up through the second embodiment in this paragraph wherein the zeolite is a Y zeolite or a Beta zeolite. An embodiment of the invention is one, any or all of prior embodiments in this paragraph up through the second embodiment in this paragraph wherein when a zeolite is used for the acid function, less than 4% of metal is incorporated in the zeolite. An embodiment of the invention is one, any or all of prior embodiments in this paragraph up through the second embodiment in this paragraph wherein the intimate mixing comprises co-mulling. An embodiment of the invention is one, any or all of prior embodiments in this paragraph up through the second embodiment in this paragraph wherein the Y zeolite or the Beta zeolite is first heat treated prior to being added to the unsupported metal oxide. An embodiment of the invention is one, any or all of prior embodiments in this paragraph up through the second embodiment in this paragraph wherein the heat treatment is at less than about 650° C.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A catalyst composition comprising an acid function and a metal function wherein said acid function and said metal function are present as separate, discrete particles that are less than 300 um apart and a median particle size of the metal function and acid function is less than 25 um wherein said acid function and said metal function are intimately mixed prior to catalyst forming, and wherein <4% of the metal function is incorporated into the acid function.

2. The catalyst of claim 1 wherein said acid function and said metal function are between about 1 to 180 um apart.

3. The catalyst of claim 1 comprising 0 (binderless) to 30 wt % binder.

4. The catalyst of claim 1 wherein said metal function comprises a Group IIB, a Group VIII, a Group VIB metal or a mixture thereof.

5. The catalyst of claim 1 wherein said acid function is contributed by a zeolite, a non-zeolite molecular sieve or an amorphous silica alumina in a concentration range from about 0.5 to 35 wt %.

6. The catalyst of claim 5 wherein said zeolite is a Y zeolite, a beta zeolite, a modified zeolite, or mixtures thereof.

7. A process comprising introducing a feedstock to a hydroprocessing reaction zone at hydroprocessing reaction conditions in the presence of a hydroprocessing catalyst, wherein said hydroprocessing catalyst is the catalyst of claim 1, to produce a hydroprocessed product.

8. The process of claim 7 wherein the hydroprocessed feedstock is selected from vacuum gas oil, kerosene, jet fuel, distillate, light cycle oil, naphtha, deasphalted oil, atmospheric gas oil, coker gas oil and mixtures thereof.

9. The process of claim 7 wherein said hydroprocessing catalyst further comprises an additional refractory oxide.

10. The process of claim 7 wherein said acid function is provided by a zeolite, a non-zeolite molecular sieve, an amorphous silica alumina or mixtures thereof in concentrations from about 0.5 to 35 wt % of said hydroprocessing catalyst.

11. The process of claim 10 wherein said zeolite is selected from a Y zeolite, a beta zeolite, a modified zeolite, or mixtures thereof.

12. The process of claim 7, wherein said metal function comprises a Group II, a Group VIII, a Group VIB metal or a mixture thereof, wherein said Group VIII metal ranges from about 2 to 25 wt % of said hydroprocessing catalyst and said Group VIB metal ranges from about 5 to 55 wt % of said hydroprocessing catalyst.

13. The process of claim 7 wherein said hydroprocessing catalyst comprises a layer within said hydroprocessing reaction zone which further comprises a second layer comprising a second hydroprocessing catalyst that is different from said hydroprocessing catalyst.

14. The process of claim 13 wherein said hydroprocessing catalyst comprises about 5-100% of a total volume of catalyst in said hydroprocessing reaction zone.

15. A method of preparing the catalyst of claim 1 comprising intimately mixing an unsupported metal oxide with an acid function.

16. The method of claim 15 wherein said unsupported metal oxide comprises Group VIII metals, and Group VIB metals, from 0-5 wt % Group IIB metals and said acid function comprises a zeolite, a non-zeolite molecular sieve, an amorphous silica alumina or mixtures thereof.

17. The method of claim 16 wherein said zeolite is a Y zeolite, a Beta zeolite, a modified zeolite, or combinations thereof.

18. The method of claim 15 wherein said intimate mixing comprises co-mulling.

19. The method of claim 16 wherein said zeolite is first heat treated at less than about 650° C. prior to being added to said unsupported metal oxide.

* * * * *